United States Patent
Walker et al.

(10) Patent No.: US 6,255,437 B1
(45) Date of Patent: Jul. 3, 2001

(54) PROCESS FOR PREPARING POLY (2,2,4,4-TETRAMETHYL-1,3-CYCLOBUTYLENE CARBONATE)

(75) Inventors: Theodore Roseuelt Walker, Kingsport, TN (US); William Ronald Darnell, Weber city, VA (US); Jean Carroll Fleischer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/453,975

(22) Filed: Dec. 8, 1999

Related U.S. Application Data

(63) Continuation-in-part of application No. 09/272,854, filed on Mar. 19, 1999, which is a continuation of application No. 08/997,432, filed on Dec. 23, 1997, now Pat. No. 6,037,436.
(60) Provisional application No. 60/034,164, filed on Dec. 28, 1996.

(51) Int. Cl.⁷ .................................................. C08G 64/00
(52) U.S. Cl. ............................................ 528/196; 528/198
(58) Field of Search ...................................... 528/196, 198

(56) References Cited

U.S. PATENT DOCUMENTS

| | | |
|---|---|---|
| 3,022,272 | 2/1962 | Schnell et al. . |
| 3,313,777 | 4/1967 | Elam et al . |
| 5,169,994 | 12/1992 | Summer, Jr. et al. . |
| 5,171,830 | 12/1992 | Grey . |

OTHER PUBLICATIONS

Derwent Abstract of JP 62–155370 (Publication No. 64–001724), Jan. 1989.
Defensive Publication No. T873,016, Gilkey et al, Apr. 28, 1970, pp. 1–14.

*Primary Examiner*—Terressa M. Boykin
(74) *Attorney, Agent, or Firm*—B. J. Boshears; H. J. Gwinnell

(57) ABSTRACT

This invention relates to a polycarbonate represented by the formula (I):

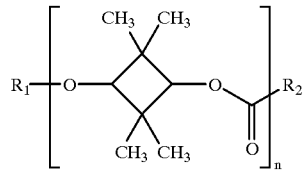

wherein $R_1$ is H, alkyl, aryl,

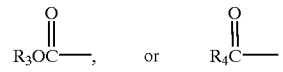

$R_2$ is alkyl, aryl, or alkoxy, $R_3$ and $R_4$ are alkyl or aryl having 1 to 20 carbons, and n is from 100 to 100,000.

26 Claims, No Drawings

PROCESS FOR PREPARING POLY (2,2,4,4-TETRAMETHYL-1,3-CYCLOBUTYLENE CARBONATE)

CROSS REFERENCE TO RELATED APPLICATIONS

This application is a continuation-in-part of U.S. application Ser. No. 09/272,854, filed on Mar. 19, 1999, which claims priority on U.S. Continuation application Ser. No. 08/997,432, filed on Dec. 23, 1997, now U.S. Pat. No. 6,037,436 which claims priority upon U.S. Provisional Application Ser. No. 60/034,164, filed Dec. 28, 1996, the contents of all applications which are hereby herein incorporated by this reference in their entireties.

FIELD OF THE INVENTION

The present invention relates to a polycarbonate prepared using 2,2,4,4-tetramethyl-1,3-cyclobutanediol.

BACKGROUND

Poly (2,2,4,4-tetramethyl-1,3-cyclobutylene carbonate) is useful as a molding resin, possesses excellent weatherability for outdoor applications, and possesses low birefringence needed for compact discs. Polycarbonates are most commonly made by using phosgene. However, use of the highly toxic phosgene and organic solvents, as well as the expense of solution polymerization methods, has prompted chemists to find other methods of producing polycarbonates.

Melt preparation of poly(2,2,4,4-tetramethyl-1,3-cyclobutylene carbonate) is challenging because it has a melting point much higher than its decomposition temperature. At decomposition temperatures, poly(2,2,4,4tetramethyl-1,3-cyclobutylene carbonate) ring-opens to produce carbon dioxide and 2-methyl-4,4-dimethyl-2-pentenal.

U.S. Pat. No. 5,171,830 discloses a melt method for making polyalkylene carbonates by reacting a glycol having at least 4 carbon atoms separating the hydroxyl groups with a diester of carbonic acid in the presence of a catalyst. This excludes 2,2,4,4-tetramethyl-1,3-cyclobutanediol, which has only 3 carbons separating the hydroxyl groups. Glycols which possess hydroxyl groups that are separated by 2 or 3 carbon atoms present a special problem for polycarbonate preparation by methods known in the art. These glycols tend to cyclize to produce five and six membered cyclic carbonates, which tend to vaporize.

Defensive Publication T873,016 discloses a method of producing low molecular weight poly(2,2,4,4-tetramethyl-1,3-cyclobutylene carbonate) by self-condensing the diethyl ester of 2,2,4,4-tetramethyl-1,3-cyclobutanediol. Defensive Publication T873,016 also discloses a method of reacting the glycol using diphenyl carbonate, which results in the formation of a colored polymer.

Methods for producing polycarbonates disclosed in the art produce low molecular weight polycarbonates when 2,2,4,4-tetramethyl-1,3-cyclobutanediol is employed as the glycol component. Japanese Patent 62-155370 discloses a process of reacting dialkyl carbonates with a glycol in the presence of a titanium catalyst. U.S. Pat. No. 3,022,272 discloses a process of reacting a carbonate, excluding dimethyl carbonate, with a glycol. Diphenyl carbonate is disclosed as the preferred carbonate, even though aromatic carbonates produce colored polymers. Lastly, U.S. Pat. No. 3,313,777 discloses a method of producing low molecular weight poly(2,2,4,4-tetramethyl-1,3-cyclobutylene carbonate) by reacting dibutyl carbonate with the glycol. Moreover, the resultant polymer solidified in the reaction vessel, requiring very impractical recovery measures to be taken.

In light of the above, it would be desirable to have a polycarbonate prepared from 2,2,4,4-tetramethyl-1,3-cyclobutanediol and dimethyl carbonate. None of the references discussed above disclose the efficient an method for preparing poly(2,2,4,4-tetramethyl-1,3-cyclobutylene carbonate).

SUMMARY OF THE INVENTION

In accordance with the purpose(s) of this invention, as embodied and broadly described herein, this invention, in one aspect, relates to a polycarbonate represented by the formula (I):

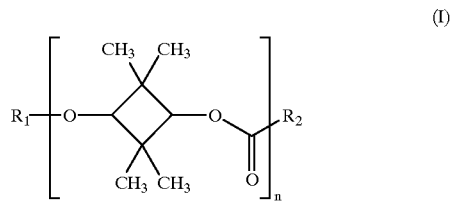

wherein $R_1$ is H, alkyl, aryl,

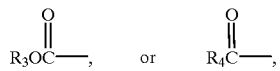

$R_2$ is alkyl, aryl, or alkoxy, $R_3$ and $R_4$ are alkyl or aryl having 1 to 20 carbons, and n is from 100 to 100,000.

In a preferred embodiment of the invention, $R_1$ is
$R_2$ is a branched or unbranched alkyl or aryl group having 1–20 carbons, and $R_3$ is methyl.

Advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

The term "intermediate" is defined as methyl carbonate-terminated oligomers formed by the condensation reaction between a glycol and dimethyl carbonate.

The term alkoxy, as used herein, and unless otherwise specified, refers to a moiety of the structure —O-alkyl.

The term aryl, as used herein, and unless otherwise specified, refers to benzyl, phenyl, biphenyl, or naphthyl.

The term alkyl, as used herein, and unless otherwise specified, refers either straight chained or branched chain radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-tri-methylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; cycloalkyl radicals, such as the cyclopentyl, cyclohexyl and cycloheptyl radical and methylcyclohexyl radicals.

The alkyl groups preferably include methyl, ethyl, propyl, isopropyl, butyl, isobutyl, tert-butyl, aryl, hexyl, and the like.

The alkyl groups described herein, either alone or with the various substituents defined hereinabove are preferably lower alkyl containing from one to six carbon atoms in the principal chain and up to 15 carbon atoms.

The aryl moieties described herein, either alone or with various substituents, contain from 6 to 15 carbon atoms and include phenyl or phenylmethyl. Substituents include alkanoxy, protected hydroxy, halogen, alkyl, aryl, alkenyl, acyl, acyloxy, nitro, amino, amido, etc. Benzyl is the more preferred aryl.

In accordance with the purpose(s) of this invention, as embodied and broadly described herein, this invention, in one aspect, relates to a polycarbonate represented by the formula (I):

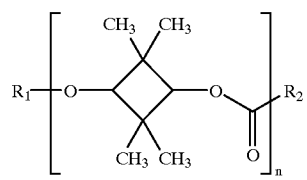

(I)

wherein $R_1$ is H, alkyl, aryl,

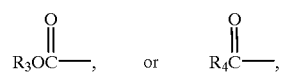

$R_2$ is alkyl, aryl, or alkoxy, $R_3$ and $R_4$ are alkyl or aryl having 1 to 20 carbons, and n is from 100 to 100,000.

In one embodiment of the invention, $R_1$ and $R_2$ independently represent a branched or unbranched alkyl group having 1 to 4 atoms.

In another embodiment of the invention, $R_1$ is H and $R_2$ is a branched or unbranched alkyl group having 1–carbons or aryl group having 1–20 carbons.

In yet another embodiment of the invention, $R_1$ and $R_2$ independently represent an aryl group having 1 to 20 carbons.

In yet another embodiment of the invention, wherein $R_1$ is

$R_2$ is a branched or unbranched alkyl or aryl group having 1–20 carbons, and $R_3$ is methyl. In this embodiment, it is preferred that $R_2$ and $R_3$ are methyl.

In yet another embodiment of the invention, wherein $R_1$ is

$R_2$ is methyl and $R_4$ is a benzyl group.

The polycarbonate of the invention may be made by any process known in the art, but is made, for example, by a process comprising:

(1) a first stage of heating a mixture comprising 2,2,4,4-tetramethyl-1,3-cyclobutanediol, dimethyl carbonate, and an effective amount of a basic catalyst, wherein the mixture contains hydroxyl groups equaling a total of 100 mole % hydroxyl groups, at a pressure, temperature, and for a time sufficient to react a sufficient number of hydroxyl groups, thereby forming an intermediate including methyl carbonate-terminated oligomer; and (2) a second stage of further reacting the intermediate under polycondensation conditions of pressure and temperature no greater than 300° C. for a time sufficient to form polycarbonate.

As described above, it is generally known in the art that the use of dimethyl carbonate is inefficient with respect to producing a polycarbonate. However, the applicants have unexpectedly discovered that the condensation reaction between a glycol and dimethyl carbonate proceeds rapidly, despite the loss of dimethyl carbonate monomer during the process.

Additionally, the present invention relates to unexpectedly high molecular weight, colorless polycarbonates, given the strong tendency for poly (2,2,4,4-tetramethyl-1,3-cyclobutylene carbonate) to decompose at temperatures required to keep the polymer in the melt. When the same process was applied to glycols other than 2,2,4,4-tetramethyl-1,3-cyclobutanediol, even slight decomposition was found to produce color. The use of glycols other than 2,2,4,4-tetramethyl-1,3-cyclobutanediol produces low molecular weight and discolored polycarbonates.

There has been no direction or motivation in the art that the reaction of 2,2,4,4-tetramethyl-1,3-cyclobutanediol with dimethyl carbonate produces the composition of the present invention.

In the present invention, a mixture of 2,2,4,4-tetramethyl-1,3-cyclobutanediol (cis, trans, or a mixture thereof) containing hydroxyl groups equaling a total of 100 mole %, dimethyl carbonate, and a basic catalyst are heated in the first step of the process to produce a methyl carbonate-terminated oligomer, which is the intermediate recited above, and methanol. In the second step of the invention, the intermediate is further reacted under polycondensation conditions at a temperature of no more than 300° C. to produce poly(2,2,4,4-tetramethyl-1,3-cyclobutylene carbonate).

The poly(2,2,4,4-tetramethyl-1,3-cyclobutylene carbonate) product of the present invention is either 1) a high molecular weight polymer or 2) a low molecular weight prepolymer which may be ground and further polymerized or polycondensed using solid state polymerization procedures known in the art. 2,2,4,4-Tetramethyl-1,3-cyclobutanediol is a useful glycol of the present invention. The applicants have discovered the use 2,2,4,4-tetramethyl-1,3-cyclobutanediol results in the formation of a clear, high molecular weight polycarbonate. In one embodiment, 2,2,4,4-Tetramethyl-1,3-cyclobutanediol is from 0 to 60 mole % the trans isomer and from 40 to 100 mole % of the cis isomer, wherein the sum of the trans and cis isomers equals 100 mole %. A poly(2,2,4,4-tetramethyl-1,3-cyclobutylene carbonate) having a trans content greater than about 60 mole % melts above 300° C., which requires higher polymerization and processing temperatures. In another embodiment, 2,2,4,4-tetramethyl-1,3-cyclobutanediol is from 48 to 52 mole % the trans isomer and from 48 to 52 mole % the cis isomer. The process of the present invention is particularly designed to operate with about 48 to 52 mole % trans glycol because that is the isomeric content of 2,2,4,4-tetramethyl-1,3-cyclobutanediol that is produced by the process of U.S. Pat. No. 5,169,994, which is a practical and economical method for the preparation of 2,2,4,4-tetramethyl-1,3-cyclobutanediol.

In another embodiment, a modifying glycol is added to 2,2,4,4-tetramethyl-1,3-cyclobutanediol and the basic catalyst in the first step in the process for preparation of the composition of the invention, which results in the formation of a copolycarbonate. In one embodiment, the modifying glycol is an aliphatic glycol having about 4 to 12 carbon atoms. In another embodiment, the modifying glycol is from 0.1 to 75 mole %, preferably from 0.1 to 50 mole %, and more preferably from 0.1 to 30 mole %, wherein the sum of the modifying glycol, 2,2,4,4-tetramethyl-1,3-cyclobutanediol, and the basic catalyst is equal to 100 mole %. Examples of modifying glycols useful in the preparation of the present invention include, but are not limited to, 1,4-cyclohexanedimethanol, 1,6-hexanediol, and 1,4-butanediol.

Other aliphatic glycols having about 4 to 12 carbons can optionally be used as the primary glycol to form polycarbonates by the present method, however these other glycols form lower molecular weight polycarbonate than does 2,2,4,4-tetramethyl-1,3 cyclobutanediol, and do not show the same unexpected results. It has been found that, unlike 2,2,4,4-tetramethyl-1,3-cyclobutanediol, the decomposition of other glycols produces terminators. The process described herein may be altered for use with other starting glycols by modifying the process conditions to reduce decomposition. The most suitable other glycols for reacting with dimethyl carbonate include 1,4-cyclohexanedimethanol, 1,6-hexanediol, 1,4-butanediol, 1,4-cyclohexanediol, 1,4-benzenedimethanol.

The carbonate source of the present process is dimethyl carbonate. Dimethyl carbonate and 2,2,4,4-tetramethyl-1,3-cyclobutanediol have been found to react in an unexpected way when using the present invention. Longer chain dialkyl carbonates provide substantially decreased molecular weight poly(2,2,4,4-tetramethyl-1,3-cyclobutylene carbonate). The larger the alkyl group, the lower the molecular weight of the polymer. Aromatic dialkyl carbonates commonly used in the art, such as diphenyl carbonate, discolor the polymer. One object of the present invention is to produce colorless polycarbonates.

Small amounts of impurities in commercially produced dimethyl carbonate produce undesirable discoloration in the polycarbonate and deactivate the catalyst. The impurities have been identified as chlorinated hydrocarbons. In one embodiment, prior to admixing 2,2,4,4-tetramethyl-1,3 cyclobutanediol, dimethyl carbonate, and the basic catalyst, the impurities in dimethyl carbonate are removed. The applicants discovered that distillation of commercial grade dimethyl carbonate prior to step (a) of the present invention results in the formation of a colorless polycarbonate.

In one embodiment, the amount of dimethyl carbonate relative to 2,2,4,4-tetramethyl-1,3-cyclobutanediol is 1:1, wherein the ratio is a molar ratio. In another embodiment, the amount of dimethyl carbonate relative to 2,2,4,4-tetramethyl-1,3-cyclobutanediol is from 1.36 to 20:1, preferably from 3:1 to 10:1. An excess of dimethyl carbonate is necessary to azeotrope with the methanol by-product. The amount of dimethyl carbonate used in the present invention ensures that dimethyl carbonate will react with at least 75 mole % of the hydroxyl groups of 2,2,4,4-tetramethyl-1,3-cyclobutanediol to produce 70/30 weight % methanol/dimethyl carbonate azeotrope at atmospheric pressure. When the molar ratio is greater than 20:1, the process becomes cost inefficient.

A catalyst useful to make the polycarbonate of the present invention is any basic catalyst that generates the 2,2,4,4-tetramethyl-1,3-cyclobutanediol oxide anion. Effective catalysts include those disclosed in Defensive Publication and U.S. Pat. No. 3,022,272, with the exception of basic reacting salts of the alkali- and alkaline earth metals of organic acids, such as sodium acetate and sodium benzoate. None of the catalysts described in U.S. Pat. No. 5,171,830 are effective. Amines in general are not effective catalysts. In addition, they produce undesirable color. Likewise, phosphines such as tributylphosphine and triphenyl phosphine are ineffective catalysts.

In one embodiment, the basic catalyst is sodium methoxide, potassium methoxide, lithium metal, sodium metal, lithium methoxide, lithium isopropoxide, or sodium ethoxide, with sodium methoxide and potassium methoxide as the preferred basic catalyst due to their low cost and availability.

The amount of basic catalyst used in the present invention is the amount that produces 2,2,4,4-tetramethyl-1,3-cyclobutanediol oxide anion in first step in the preparation of the polycarbonate of the present invention. In one embodiment, the amount of base catalyst used is the amount required for about 75 mole % of the hydroxyl groups of 2,2,4,4-tetramethyl-1,3-cyclobutanediol to react with dimethyl carbonate. In one embodiment, the basic catalyst is from 0.015 to 0.7 mole %, preferably about 0.03 to 0.3 mole %, more preferably from about 0.03 to 0.1 mole %, wherein the sum of 2,2,4,4-tetramethyl-1,3-cyclobutanediol and the basic catalyst is 100 mole %.

In the method useful in making the polycarbonate of the present invention, 2,2,4,4-tetramethyl-1,3-cyclobutanediol, dimethyl carbonate, and the basic catalyst are added to a reaction vessel and heated such that 2,2,4,4tetramethyl-1,3-cyclobutanediol reacts with dimethyl carbonate, yet the temperature is low enough to avoid boiling off unreacted dimethyl carbonate. Herein, the boiling point of dimethyl carbonate is defined as the boiling point of non-azeotroped dimethyl carbonate, at a given pressure. The boiling point of dimethyl carbonate at atmospheric pressure is about 90° C.

In order for 2,2,4,4-tetramethyl-1,3-cyclobutanediol to react with dimethyl carbonate in the first step of the method for preparation of the polycarbonate, the methanol by-product must be removed since it competes with 2,2,4, 4-tetramethyl-1,3-cyclobutanediol, which reacts with dimethyl carbonate. At atmospheric pressure, methanol forms an azeotrope with dimethyl carbonate, which results in the loss of dimethyl carbonate when the ethanol by-product is distilled from the reaction. In one embodiment, an excess amount of dimethyl carbonate is required when the process is conducted under azeotrope-forming conditions. The boiling point of methanol is about 65° C. at atmospheric pressure. The boiling point of methanol where a dimethyl carbonate/methanol azeotrope is formed is about 62° C. at atmospheric pressure.

The reaction conditions (i.e. temperature, pressure, duration of the reaction) of step (a) can be varied in order to ensure that 2,2,4,4-tetramethyl-1,3-cyclobutanediol reacts with dimethyl carbonate to produce the intermediate of the first step of the method for preparation of the polycarbonate. The phrase "sufficient time, temperature, and pressure" are the parameters that can be varied in order for at least 75 mole % of the hydroxyl groups of 2,2,4,4-tetramethyl-1,3-cyclobutanediol to react with dimethyl carbonate. In one embodiment, at least 90 mole %, and preferably at least 98 mole % of the hydroxyl groups of 2,2,4,4tetramethyl-1,3-cyclobutanediol react with dimethyl carbonate. Reaction times will also vary depending upon the catalyst selected and the amount of catalyst that is used. In one embodiment, the reaction time of step (a) is from about 0.5 to 1.5 hours.

The admixture in the first step for preparation of the polycarbonate is heated to the boiling point of methanol to the boiling point of dimethyl carbonate. When conducted at atmospheric pressure, this is from about 62° C. to 100° C. Thus, the boiling point of the solvent/azeotrope mixture controls the required reaction temperature. As methanol is removed, the reaction temperature rises to the boiling point of dimethyl carbonate. The term "atmospheric pressure", as used herein, refers to a pressure between 725 to 760 torr. Pressure may be increased to achieve higher reaction temperatures for faster reaction rate and to avoid azeotrope formation.

Excess dimethyl carbonate reactant is removed from the reaction mixture by distillation at the end of the first step in the preparation of the polycarbonate in order to reach higher reaction temperatures in the second step. In one embodiment, unreacted dimethyl carbonate is distilled off at a temperature of from about 90 to 140° C. at atmospheric pressure.

The intermediate of first step in the preparation of the polycarbonate is contacted with an acid. By contacting this intermediate with an acid, preferably a carboxylic acid, some of the glycol oxide that was generated in the first step is protonated. In one embodiment, the carboxylic acid is formic, acetic or pivalic acid. This provides slow release of the active catalyst and any remaining 2,2,4,4-tetramethyl-1, 3-cyclobutanediol oxide anion from the intermediate in second step. Slow release of the active catalyst is desirable in second step because a high concentration of catalyst promotes the decomposition of the resultant polycarbonate produced in second step.

In another embodiment, 1) 2,2,4,4-tetramethyl-1,3-cyclobutanediol, dimethyl carbonate, and the basic catalyst are admixed and 2) heated from 62 to 100° C. at from 725 to 760 torr, wherein at least 75 mole % of the hydroxyl groups of 2,2,4,4-tetramethyl-1,3-cyclobutanediol have reacted with dimethyl carbonate.

In second step of the present invention, the intermediate is further reacted under polycondensation conditions such that the intermediate condenses, which results in the formation of a high molecular weight polycarbonate and subsequent formation of dimethyl carbonate as the by-product of the condensation reaction. In one embodiment, the intermediate is heated from 180° C. to 300° C. The temperature should not exceed about 300° C. in order to avoid thermal decomposition of low molecular weight oligomer (the intermediate). Dimethyl carbonate by-product reacts with the remaining unreacted glycol, and the excess dimethyl carbonate is removed. In one embodiment, dimethyl carbonate is preferably removed from the reaction mixture by distillation as it forms.

In a process preferred for the preparation of the polycarbonate, the temperature at which the intermediate is heated in second step is from 190° C. to 285° C., preferably from 200° C. to 270° C., and more preferably from 220° C. to 240° C. In another embodiment, a heating schedule can be used to produce a high molecular weight oligomer before vacuum is applied so that loss of oligomer is minimized. In one embodiment, the heating schedule comprises heating the intermediate at 200° C. for 30 minutes, then at 220° C. for 30 minutes, then at 240° C. for 30 minutes, and finally 270° C. under vacuum until a high molecular weight polycarbonate has been produced.

In another process preferred for the preparation of the polycarbonate, the temperature at which the intermediate is heated in second step is dependant upon the cis/trans ratio of the polycarbonate produced in the present invention. The polycarbonate melting point is dependent upon the cis/trans ratio. For practical reasons, the polycarbonate should not solidify in the reactor. In one embodiment, the intermediate is heated at the lowest possible temperature in order to prevent the polycarbonate from solidifying, and, thus, provide a reasonable reaction rate in step (b). In one embodiment, a temperature range that ensures a reasonable reaction rate with minimal decomposition is from 220° C. to 240° C. In another embodiment, when higher temperatures are required, the lowest temperature required to keep the polymer from solidifying is preferred. It is known in the art that by increasing the reaction temperature, the reaction rate and the decomposition rate also increases. However, decomposition does not reduce the molecular weight of the polycarbonate, it only reduces yield of the polycarbonate.

It is well known in the art that any process for making bisphenol A polycarbonate from dialkyl carbonates, the formation of terminators is a problem. When dimethyl carbonate is used, the terminator is the methyl ether of bisphenol A. In the method useful in present invention, the applicants unexpectedly discovered when 2,2,4,4-tetramethyl-1,3-cyclobutanediol is used in the present invention, the formation of terminators was not observed.

The poly(2,2,4,4-tetramethyl-1,3-cyclobutylene carbonate) produced in accordance with the process of the present invention has an inherent viscosity less than or equal to 0.90 dL/g, preferably about 0.60 to 0.70 dL/g, as determined in 30/70 phenol/tetrachloroethane at 25° C. In another embodiment, the catalyst residue contained in the polymer can optionally be deactivated by removal or neutralization using techniques known in the art (i.e. treatment with an acid). Removal or deactivation of the basic catalyst can enhance the weatherability and thermal stability of the polycarbonate.

The process useful in the present invention is a base catalyzed melt polymerization of 2,2,4,4-tetramethyl-1,3-cyclobutanediol and dimethyl carbonate. In one embodiment, the reaction is carried out in one reaction vessel. In another embodiment, the two step process is from 1 to 14 hours.

The process useful in the present invention can be used to produce a low molecular weight polymer, which is subsequently dried and ground into powder or pellets for solid-state polymerizing to produce a high molecular weight polycarbonate. Solid-state polymerization produces higher yield of polycarbonate than melt polymerization because solid-state polymerization is conducted at a lower reaction temperatures than melt polymerization, thus resulting in less decomposition.

The polycarbonate of the present invention is useful in the manufacture of various articles such as molded objects, extruded objects, fibers, and films, especially articles requiring better weatherability.

EXAMPLES

The following examples are put forth so as to provide those of ordinary skill in the art with a complete disclosure and description of how the methods claimed herein are used and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

Examples 1 through 13 illustrate different embodiments of the process of the present invention. Each of these examples shows the effect that changing various process parameters has upon the polymer product.

The inherent viscosity (IV) determinations were determined in 30/70 phenol/tetrachloroethane at 25° C.

Example 1

This Example illustrates one embodiment of the present invention.
Step (a)
43.2 g (0.33 mole) 2,2,4,4tetramethyl-1,3-cyclobutanediol containing 50 mole % trans isomer was mixed with 140 mL (1.66 moles) dimethyl carbonate in a 500 mL 3-neck flask equipped with a mechanical stirrer and a 14-inch vigreux column topped with a distillation head. The system was placed under an argon blanket and about 15 mL dimethyl carbonate was distilled off for purposes of drying and deaerating the system. Then, 1.5 mL (0.1 mmole/mL in methanol) sodium methoxide solution was added (67 ppm Na, based on a 51 g theoretical yield of polymer). Methanol/dimethyl carbonate azeotrope was distilled slowly from the mixture over a period of 3 hours and the mixture was sampled for GC analysis, which showed that more than 99 mole % of the hydroxyl groups had reacted to form oligomer. Excess dimethyl carbonate was distilled off at 150° C.
Step (b)
The oligomer formed in the first stage was heated according to the following schedule under an inert atmosphere: 200° C. for 1 hour, then 220° C. for 1 hour, then 240° C. for 1 hour, then the distillation column was removed and the mixture was heated at 275° C. for 20 minutes under vacuum.

The resulting polymer was colorless and had an inherent viscosity of 0.72 dL/g, with a 71% yield. Additional test results are shown in Table 1.

Example 2

This Example illustrates the same process as in Example 1, except the amount of dimethyl carbonate was doubled. By doubling the amount of dimethyl carbonate, the process produced a polycarbonate having an increased inherent viscosity of 0.83 dL/g, as shown in Table 1.

Example 3

This Example illustrates the same process as in Example 2, except a higher catalyst concentration (135 ppm) and longer vacuum time (45 minutes) was used. The polymer produced by this process had an inherent viscosity of 0.78 dL/g, as shown in Table 1. This Example shows that a vacuum time of 45 minutes produces a lower yield, in this case a 51% yield.

Example 4

This Example illustrates the same process as in Example 1, except with decreased catalyst concentration and less vacuum time. Examples 3 and 4 show that an increased catalyst level promotes more decomposition and a lower yield.

Example 5

This Example illustrates the same process as Example 2, except for decreased vacuum time. This Example shows that increasing vacuum time from 10 minutes to 20 minutes at 275° C. appreciably increases inherent viscosity without lowering yield.

Example 6

This Example illustrates the same process as Example 3, except the step (b) heating time was much shorter: 200° C. for 30 minutes, 220° C. for 30 minutes, 240° C. for 30 minutes, and 30 minutes at 275° C. under vacuum. The polymer formed from this Example had a appreciably lower inherent viscosity of 0.59 dL/g.

Example 7

This Example illustrates that, in step (a) of the present invention, a significant portion of the hydroxyl groups can be left unreacted and still produce a useful final polymer. In Example 1, all the hydroxyl groups were reacted in step (a). In this Example 7, 11% of the hydroxyl groups were unreacted.

Examples 8–13

These Examples illustrate processes similar to Examples 1–7, however, the trans isomer concentration of 2,2,4,4tetramethyl-1,3-cyclobutanediol is lower. It can be seen from Table 1 that in all the Examples, the trans isomer content of the polymer is less than the trans isomer content of the glycol.

Example 10

This Example illustrates a process following the process of Example 1, except with a lower trans glycol and with the distillation column kept under vacuum, and with the following heating schedule in the second stage: 200° C. for 30 minutes, 220° C. for 30 minutes and skipped 240° C. heating. This Example illustrates a variation of the process of the present invention.

Examples 11–13

These Examples illustrate the effect of vacuum temperature on yield. The procedure followed was the same as Example 1, except that the trans content of the glycol was 42.6 mole % and the vacuum temperature varied as shown in Table 1. The results are shown in Table 1. Examples 11–13 show that yield decreases with increasing temperature.

TABLE 1

Summary of Examples 1–13

| | | Conditions | | | HO— | | Results | | | trans in |
|---|---|---|---|---|---|---|---|---|---|---|
| Ex | trans TMCD (mole %) | Catalyst (ppm Na) | Dimethyl Carbonate (mL) | Vacuum Temp (° C.) | Vacuum Time (min) | after Stage 1 (mole %) | in. V. (dL/g) | Yield (%) | Tg (° C.) | Tm (° C.) | Polymer (%) |
| 1 | 50 | 70 | 140 | 275 | 20 | 0 | 0.72 | 71 | 132 | 256 | 44.5 |
| 2 | 50 | 70 | 280 | 275 | 20 | 0 | 0.83 | 70 | 138 | 244 | 42 |
| 3 | 50 | 135 | 280 | 275 | 45 | 0 | 0.78 | 51 | 135 | 230 | 33 |
| 4 | 50 | 45 | 140 | 275 | 10 | 0 | 0.66 | 72 | 130 | 256 | 43 |
| 5 | 50 | 70 | 280 | 275 | 10 | 0 | 0.62 | 70 | 124 | 248 | 42 |
| 6 | 50 | 135 | 280 | 275 | 30 | 0 | 0.59 | 78 | 131 | 263 | 48 |
| 7 | 50 | 70 | 140 | 285 | 23 | 11 | 0.60 | 70 | 130 | 257 | 42 |
| 8 | 46.7 | 70 | 140 | 275 | 25 | 0 | 0.66 | 70 | 127 | 237 | 39 |
| 9 | 46.7 | 70 | 140 | 275 | 15 | 0.3 | 0.77 | 61 | 134 | none | 36 |
| 10 | 46.7 | 70 | 140 | 275 | 25 | 0.1 | 0.65 | 71 | 128 | 240 | 40 |
| 11 | 42.0 | 70 | 140 | 265 | 30 | 0 | 0.71 | 72 | 132 | 232 | 37 |
| 12 | 42.0 | 70 | 140 | 275 | 15 | 0 | 0.76 | 67 | 132 | none | 32 |
| 13 | 42.0 | 70 | 140 | 285 | 15 | 0 | 0.75 | 64 | 131 | 212 | 32 |

TMCD = 2,2,4,4-tetramethyl-1,3-cyclobutanediol,
HO— = Mole % TMCD containing unreacted hydroxyl at the end of stage 1.
Tg = glass transition temperature determined by differential scanning calorimetry
Tm- melting point determined by differential scanning calorimetry
I.V. = inherent viscosity

Example 14

This Example illustrates the ineffectiveness of using titanium as a catalyst, which is a common polyester and polycarbonate catalyst used in the process of JP 62-155370 to Nishimura.

Step (a): 43.2 g (0.33 mole) 2,2,4,4-tetramethyl-1,3-cyclobutanediol containing 50 mole % trans isomer was mixed with 140 mL (1.66 moles) dimethyl carbonate in a 500-mL 3-neck flask equipped with a mechanical stirrer and a 14-inch vigreux column topped with a distillation head. As in Example 1, the system is placed under an argon blanket and about 15 mL dimethyl carbonate was distilled off for purposes of drying and deaerating the system. 26.5 mg of titanium tetraisopropoxide was added and the mixture was refluxed with a slow removal of dimethyl carbonate through the head. After 4 hours of heating at reflux with slow removal of dimethyl carbonate, a sample was taken. GC analysis of the sample showed that less than 1 mole % of the hydroxyls had reacted.

Example 15

This Example illustrates the use of the solid-state polymerization technique in conjunction with the process of the present invention.

The procedure of Example 1, except with the use of 0.10 g lithium isopropoxide catalyst. Under vacuum, polymerization was stopped before high viscosity was reached. Poly(2,2,4,4-tetramethyl-1,3-cyclobutylene carbonate) having an inherent viscosity of 0.31 was produced.

The 0.31 dL/g I.V. polycarbonate was thermally crystallized at less than 1 mm mercury pressure in a heating block at 180° C. for 30 minutes and then for 205° C. for 30 minutes. Afterwards, the polymer was heated for 6 hours at 230° C. at less than 1 mm mercury pressure, yielding a polymer having an inherent viscosity of 0.67 dL/g. Heating for 6 more hours at 230° C. gave a polymer having an inherent viscosity of 0.74 dL/g.

This Example shows that solid-stating is a viable process to use in conjunction with the process of the present invention.

Example 16

This Example illustrates the effect of substituting dimethyl carbonate with higher dialkyl carbonates in the process of the present invention. As shown in Table 2, the inherent viscosity (I.V) and yield are reduced with an increase in alkyl chain length.

The results shown in Table 2 were measured from experiments using 43.2 g of 50 mole % 2,2,4,4tetramethyl-1,3-cyclobutanediol and sodium methoxide catalyst (135 ppm Na based on theoretical yield of 51 g). The polymerizations using diethyl and dibutyl carbonate were kept under vacuum longer because they were producing low inherent viscosity p lymers.

The results in Table 2 show that there is an unexpectedly significant improvement in inherent viscosity, a measure of molecular weight, and yield when reacting 2,2,4,4-tetramethyl-1,3-cyclobutanediol with dimethyl carbonate instead of one of the other dialkyl carbonates.

TABLE 2

Effect of Dialkyl Carbonates on Inherent Viscosity and Yield

| Dialkyl Carbonate | Carbonate Amount (mL) | Vacuum Temp (° C.) | Vacuum Time (min) | I.V. (dL/g) | Yield (%) | Tg (° C.) | Tm (° C.) |
|---|---|---|---|---|---|---|---|
| dimethyl | 280 | 275 | 45 | 0.68 | 67 | 131 | 255 |
| diethyl | 142 | 275 | 60 | 0.45 | 59 | 110 | 243 |
| dibutyl | 209 | 275 | 90 | 0.28 | 50 | 93 | 229 |
| dibutyl | 314 | 275 | 60 | 0.32 | 45 | 104 | 221 |

Glass transition temperature (Tg) and melting point (Tm) of poly(2,2,4,4-tetramethyl-1,3-cyclobutylene carbonate) were determined by differential scanning calorimetry (DSC).

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A polycarbonate represented by the formula (I):

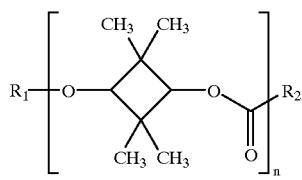

wherein $R_1$ is H, alkyl, aryl,

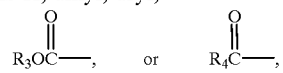

$R_2$ is alkyl, aryl, or alkoxy, $R_3$ and $R_4$ are alkyl or aryl having 1 to 20 carbons, and n is from 100 to 100,000.

2. The polycarbonate of claim 1, wherein $R_1$ and $R_2$ independently represent a branched or unbranched alkyl group having 1 to 4 atoms.

3. The polycarbonate of claim 1, wherein $R_1$ and $R_2$ independently represent an aryl group having 1 to 20 carbons.

4. The polycarbonate of claim 1, wherein $R_1$ is H and $R_2$ is a branched or unbranched alkyl group having 1–4 carbons or aryl group having 1–20 carbons.

5. The polycarbonate of claim 1, wherein $R_1$ is

$R_2$ is a branched or unbranched alkyl or amyl group having 1–20 carbons, and $R_3$ is methyl.

6. The polycarbonate of claim 1, wherein $R_1$ is

and $R_2$ and $R_3$ are methyl.

7. The polycarbonate of claim 1, wherein $R_1$ is

$R_2$ is methyl and $R_4$ is a benzyl group.

8. The polycarbonate of claim 7 prepared using 2,2,4,4-tetramethyl-1,3-cyclobutanediol comprising 48 to 52 mole % trans isomer and from 52 to 48 mole % of a cis isomer, wherein the sum of trans and cis isomers equals 100 mole %.

9. The polycarbonate of claim 7 wherein a modifying glycol is used.

10. The polycarbonate of claim 9 wherein the modifying glycol is an aliphatic glycol of from 4 to 12 carbon atoms.

11. The polycarbonate of claim 9 wherein the modifying glycol comprises 1,4-cyclohexanedimethanol, 1,6-hexanediol, 1,4-butanediol, or a combination thereof.

12. The polycarbonate of claim 1 prepared using a basic catalyst.

13. The polycarbonate of claim 9 prepared using a basic catalyst.

14. The polycarbonate of claim 9 wherein the modifying glycol is from 0.1 to 50 mole %, wherein the sum of the modifying glycol, 2,2,4,4-tetramethyl-1,3-cyclobutanediol, and the basic catalyst is 100 mole %.

15. The polycarbonate of claim 14 wherein the modifying glycol is from 0.1 to 30 mole %, wherein the sum of the modifying glycol, 2,2,4,4-tetramethyl-1,3-cyclobutanediol, and the basic catalyst is 100 mole %.

16. The polycarbonate of claim 1 wherein the molar ratio of dimethyl carbonate relative to the 2,2,4,4-tetramethyl-1,3-cyclobutanediol is 1.1.

17. The polycarbonate of claim 16 wherein the molar ratio is from 1.36:1 to 20:1.

18. The polycarbonate of claim 17 wherein the molar ratio is from 3:1 to 10:1.

19. The polycarbonate of claim 13 wherein said basic catalyst comprises sodium methoxide, potassium methoxide, lithium metal, sodium metal, lithium methoxide, sodium ethoxide, lithium isopropoxide, or a combination thereof.

20. The polycarbonate of claim 19 wherein said basic catalyst comprises sodium methoxide, potassium methoxide, or a combination thereof.

21. The polycarbonate of claim 13, wherein the basic catalyst is from 0.15 to 0.7 mole %, wherein the sum of the 2,2,4,4-tetramethyl-1,3-cyclobutanediol and the basic catalyst is 100 mole %.

22. The polycarbonate of claim 21, wherein the basic catalyst is from 0.03 to 0.3 mole %, wherein the sum of the 2,2,4,4-tetramethyl-1,3-cyclobutanediol and the basic catalyst is 100 mole %.

23. The polycarbonate of claim 1 having a inherent viscosity of less than or equal to 0.90 dL/g, as determined in 30/70 phenol/tetrachloroethane at 25° C.

24. The polycarbonate of claim 23 having a inherent viscosity of from 0.60 to 0.70 dL/g, as determined in 30/70 phenol/tetrachloroethane at 25° C.

25. The polycarbonate of claim 1 prepared using 2,2,4,4tetramethyl-1,3-cyclobutanediol comprising 0 to 100 mole % trans isomer and from 100 to 0 mole % of a cis isomer, wherein the sum of trans and cis isomers equals 100 mole %.

26. The polycarbonate of claim 25 prepared using 2,2,4,4-tetramethyl-1,3-cyclobutanediol comprising 0 to 60 mole % trans isomer and from 100 to 40 mole % of a cis isomer, wherein the sum of trans and cis isomers equals 100 mole %.

* * * * *

UNITED STATES PATENT AND TRADEMARK OFFICE
CERTIFICATE OF CORRECTION

PATENT NO. : 6,255,437 B1
DATED : July 3, 2001
INVENTOR(S) : Walker et al.

Page 1 of 1

It is certified that error appears in the above-identified patent and that said Letters Patent is hereby corrected as shown below:

Title page,
Item [75], "Theodore Roseuelt Walker" should be -- Theodore Roosevelt Walker --

Item [22], "December 8, 1999" should be -- December 2, 1999 --

Column 13,
Line 40, "amyl" should be -- aryl --.

Signed and Sealed this

Fifteenth Day of January, 2002

Attest:

Attesting Officer

JAMES E. ROGAN
Director of the United States Patent and Trademark Office